(12) United States Patent
Hicks (10) Patent No.: US 6,318,543 B1
(45) Date of Patent: Nov. 20, 2001

(54) PRODUCT TRANSPORT SYSTEM

(75) Inventor: Kevin Joseph Hicks, Middle Cove (AU)

(73) Assignee: Commander Land & Air Investments Pty Limited, Hornsby (AU)

( * ) Notice: Subject to any disclaimer, the term of this patent is extended or adjusted under 35 U.S.C. 154(b) by 0 days.

(21) Appl. No.: 09/514,814

(22) Filed: Feb. 28, 2000

(51) Int. Cl.[7] ............................................. B65G 17/18
(52) U.S. Cl. ............................................................. 198/800
(58) Field of Search ............................... 198/800, 867.11, 198/867.12, 867.15; 99/362; 62/380

(56) References Cited

U.S. PATENT DOCUMENTS

| | | |
|---|---|---|
| 1,531,847 | 3/1925 | Danforth et al. . |
| 1,905,224 | 4/1933 | Hass et al. . |
| 2,493,857 | 10/1950 | Cargill . |
| 3,150,765 * | 9/1964 | Ellis ................................ 198/867.15 |
| 3,587,829 * | 6/1971 | Sorensen ......................... 198/867.12 |
| 4,346,803 * | 8/1982 | Haessler et al. ..................... 198/800 |
| 4,378,873 * | 4/1983 | Cloudy ................................ 198/800 |
| 4,421,227 * | 12/1983 | Kornylak ............................. 198/800 |
| 6,010,016 * | 1/2000 | Siegal ............................. 198/867.15 |

FOREIGN PATENT DOCUMENTS 8071839    10/1984    (JP) .

* cited by examiner

*Primary Examiner*—Joseph E. Valenza
(74) *Attorney, Agent, or Firm*—Ladas & Parry (57) ABSTRACT

A product transport system which is located predominantly within a chamber 10 (for example, an industrial oven chamber) and which comprises a pair of parallel, spaced apart conveyor chains 19. The conveyor chains are arranged to convey a plurality of transversely extending product support trays 15 through the chamber 10. Pairs of transversely spaced carriers 31 are provided to carry respective ones of the trays 15. Chain sprockets 20 are located within the chamber in alignment with the respective conveyor chains and the sprockets 20 are arranged to direct the respective conveyor chains through changes in direction (including through forward-and-return horizontal passes) within the chamber 10. Rotatable guide members 28 in the form of toothed wheels are positioned laterally adjacent to but out of alignment with respective ones of the chain sprockets 20, and a subsidiary chain drive is provided for driving each guide member 28 in synchronism with an adjacent one of the chain sprockets 20. Each of the carriers 31 has a first spigot 34 that is connected to an associated one of the conveyor chains 19 and has a second (relatively shorter) spigot 38 that is positioned to engage with one of the guide members 28 when a portion of the conveyor chain 19 to which the first spigot 34 is connected is being directed around an adjacent one of the chain sprockets 20.

11 Claims, 6 Drawing Sheets

PRODUCT TRANSPORT SYSTEM

FIELD OF THE INVENTION

This invention relates to a product transport system and, in particular, to a system for transporting product support trays along a non-linear path. The invention has been developed in the context of a food processing installation and the invention is hereinafter described in that context. However, it will be understood that the invention does have broader application, for example to the transportation of industrial products through a processing zone.

BACKGROUND OF THE INVENTION

In the most relevant of all known food processing installations, dough deposits are loaded onto flat or compartmented product support trays and are conveyed serially through an oven chamber. The trays would normally also be conveyed through at least one further chamber, for example a cooling chamber, a refrigerating chamber or a tray washing chamber. In moving through the oven chamber (and, similarly, through other chambers) the trays are conveyed in a manner such that they make a succession of forward-and-return horizontal passes along the length of the chamber. The trays are supported by individual carriers, from which they may be removed, and each carrier is connected to and extends between two spaced-apart parallel conveyor chains which are driven by a common drive system to move through the chamber. The respective conveyor chains are guided by sprockets to make the changes in direction between the forward-and-return horizontal passes and, also, at opposite ends of the chamber to direct the conveyor chains in vertical directions between the upper and lower levels of the chamber.

The tray carriers extend across substantially the full width of the chamber and they are pivotably connected at their ends (adjacent side walls of the chamber) to the conveyor chains. The pivotable connection permits each tray carrier to maintain a horizontal disposition when being conveyed around the sprockets and when being conveyed (upwardly or downwardly) in a vertical direction.

Horizontal rails are provided at each side of the chamber and they are used to maintain the tray carriers in a stable, horizontal disposition when the carriers are moved along the horizontal passes within the chamber. However, the known food processing installation does not make any provision for maintaining the trays in a horizontal disposition other than when the tray carriers are supported by the horizontal rails.

A significant problem that has been found to exist in the known food processing installations is that, with any eccentric loading or disturbance of any of the trays, the affected trays and tray carriers are caused to rock when being transported around sprockets or in a vertical direction. This problem is exacerbated with large sized trays and/or when relatively large dough deposits are carried by the trays.

When rocking of a tray becomes sufficiently pronounced, the associated tray carriers that are about to move into a horizontal pass may momentarily be tilted to such an extent that they will be misdirected below the intended horizontal support rails. When this happens, crashing may (and has been known to) occur between moving trays and fixed structures within the chamber.

An attempt has been made to alleviate the above stated problem by connecting each pair of tray carriers with a relatively heavy transversely extending metal bar. The use of these bars has to a limited extend been helpful in minimizing rocking of the trays, but the use of the bars has created further problems. Given the fact that, in a typical installation, something in the order of 200 trays may be conveyed through and from the oven chamber (and other associated chambers) in the installation, the bars add significantly to the thermal mass of the system, to the drive power requirements and to cooling requirements if the trays are to be conveyed through a cooling chamber following movement through the oven chamber.

SUMMARY OF THE INVENTION

The present invention seeks to provide a system which, in a particular embodiment, facilitates stable conveyance of product support trays through a chamber in circumstances where the direction of movement of the trays is required to be changed whilst moving through the chamber.

As indicated previously, the invention has application to a product transport system of a type that is contained within a chamber (for example, an oven chamber), and in this context the invention may be defined more particularly as follows:

A product transport system which comprises a chamber, a pair of parallel, spaced-apart conveyor chains located within the chamber and arranged to convey a plurality of transversely extending product support trays through the chamber, a pair of transversely spaced carriers arranged to carry respective ones of the trays, chain sprockets located within the chamber in alignment with the respective conveyor chains and arranged to direct the respective conveyor chains through changes in direction (including through forward-and-return horizontal passes) within the chamber, rotatable guide members positioned laterally adjacent to but out of alignment with respective ones of the chain sprockets, and means for driving each guide member in synchronism with an adjacent one of the chain sprockets. Each carrier has a first spigot that is connected to an associated one of the conveyor chains and a second spigot that is positioned and arranged to engage with a said guide member when a portion of the conveyor chain to which the first spigot is connected is being directed around an adjacent one of the chain sprockets.

In the above defined transport systems a two-point support is provided for each of the carriers when it is conveyed through changes in direction. This obviates the pivoting problem that is inherent in single-pivotal support. Also, it facilitates the maintenance of a constant (usually horizontal) disposition of each carrier as it is conveyed through changes in direction.

PREFERRED FEATURES OF THE INVENTION

Various arrangements may be employed for maintaining each of the carriers in a horizontal disposition when it is being conveyed in a horizontal direction. However, it is preferred that horizontally extending rails be provided for supporting horizontal passes of the conveyor chain and, at the same time, for supporting the second spigot of each carrier.

In the embodiment of the invention that incorporates product support trays, the trays preferably are removably mounted to support frames which, in turn, are removably mounted to the carriers.

The invention will be more fully understood from the following description of a preferred embodiment of a product transport system that is embodied in a food processing oven. The description is provided with reference to the accompanying drawings.

DETAILED DESCRIPTION OF THE INVENTION

Figure 1:
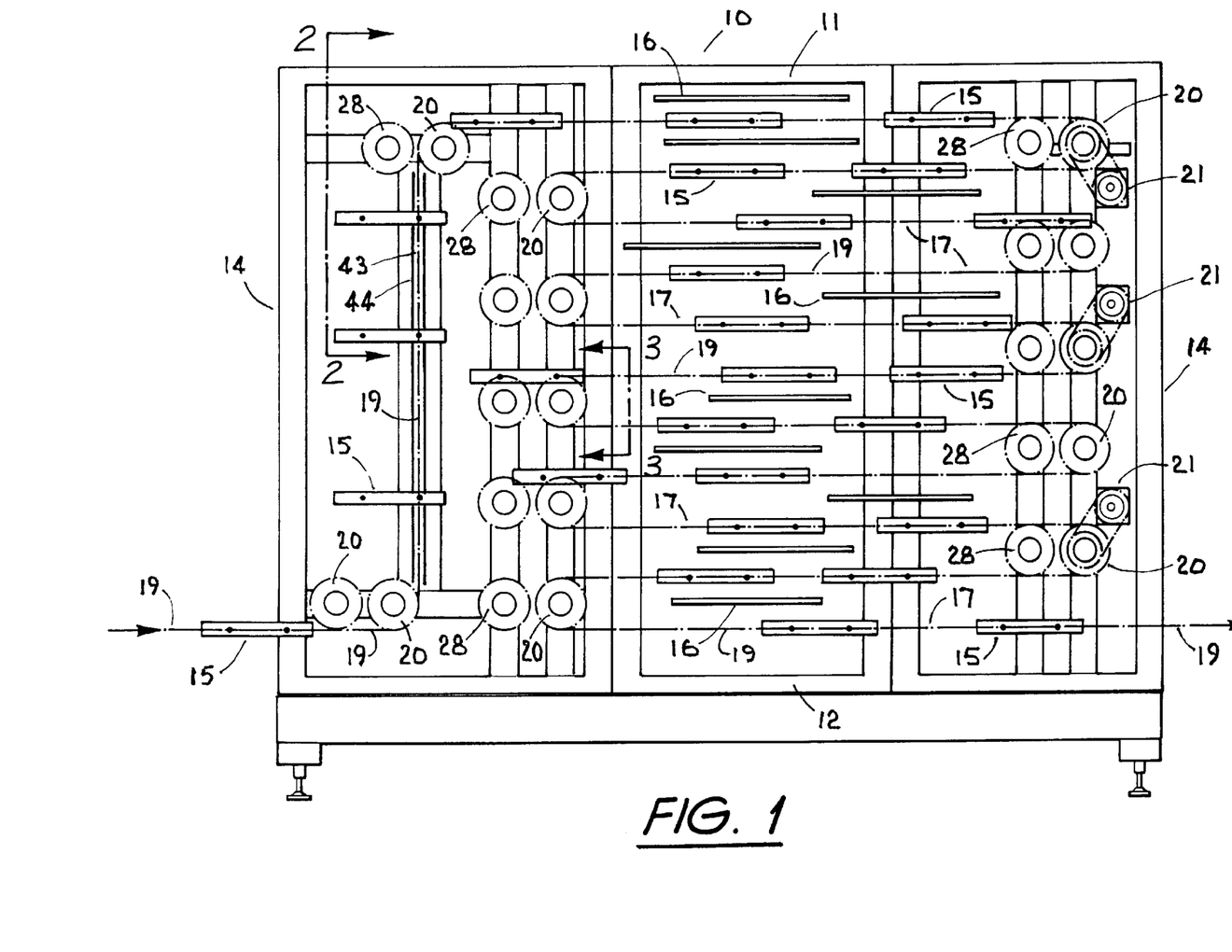
FIG. 1 shows in a diagrammatic manner a side elevation view of the interior of a food processing oven that incorporates the product transport system.
Figure 2:
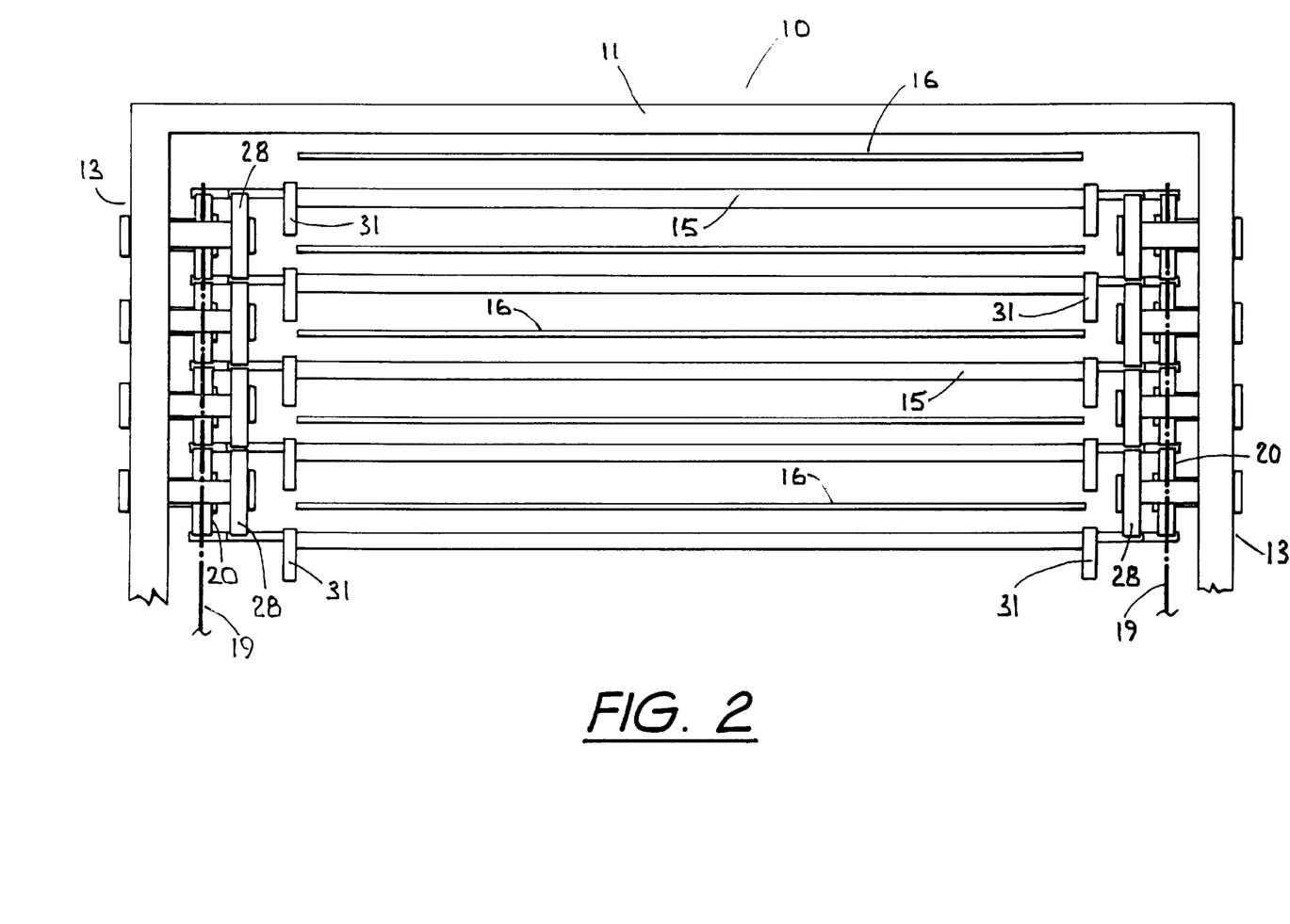
FIG. 2 shows, also in a diagrammatic manner, a partial end view of the interior of the food processing oven, the view being seen in a direction of section plane 2—2 as shown in FIG. 1.

As illustrated in FIGS. 1 and 2, the transport system is located within an oven chamber 10 having a top wall 11, a bottom wall 12, side walls 13 and end walls 14. The oven is illustrated in a diagrammatic way, largely for the purpose of placing the transport system in one possible context, and it will be understood that many features or detail are omitted from the drawings for the sake of clarity. Also, it will be understood that the oven will typically be dimensioned to accommodate as many as 200 product support trays 15 within the chamber 10 at any one time, and that the support trays 15 normally would be positioned in closely spaced relationship.

Transversely extending heating elements 16 are located within the oven chamber 10 between each of the forward-and-return horizontal passes 17 of the transport system. The heating elements 16 may comprise electrically energised elements or be in the form of thermal plates through which heated oil is passed.

The transport system comprises a pair of parallel endless conveyor chains 19 which are spaced apart in the transverse direction of the chamber 10 and which are located respectively adjacent the side walls 13 of the chamber. The conveyor chains are provided to convey the product support trays 15 into, through and from the oven chamber 10. Also, although not so shown, in a typical production system the conveyor chains 19 will pass serially through a dough depositing station, through the oven chamber 10, through a cooling chamber, through a product unloading station, through a tray washing station and back to the depositing station. At least one variable speed drive mechanism (not shown) will typically be located in the path of the conveyor chain 19, for example between chambers and/or in the return path, for imparting drive to the conveyor chains.

Chain sprocket wheels 20 (herein referred to as "sprockets") are located adjacent each of the side walls 13 of the oven chamber 10 and are provided for directing the conveyor chains 19 through changes in direction within the chamber. Thus, the sprockets 20 are provided for directing the conveyor chains 19 into vertically extending (i.e. ascending and descending paths) and into the forward-and-return passes 17 within the chamber.

The chain sprockets 20 are not driven to import motion to the chains 19 but, rather, function solely to guide the chains through their changes in direction. However, some of the sprockets 20 adjacent one side wall 13 are coupled by shafts 21 to sprockets that are adjacent the other side wall 13 of the chamber, for the purpose of ensuring synchronised movement of both of the conveyor chains 19 within the chamber.

The chain sprockets 20 are mounted to live axles 22. Although not shown in the drawings, the axles 22 are supported by bearing housings in the side walls 13 of the chamber 10.

The conveyor chains 19 have rollers 23 carried by link pins 24 that interconnect the chain links 25. The rollers are dimensioned to mesh with the chain sprockets 20.

Horizontal rails 26 are mounted to the side walls 13 of the chamber for supporting the portions of the conveyor chains 19 that are at any one time making horizontal passes through the chamber 10. The chains 19 are supported upon the horizontal rails 26 by way of the rollers 23.

Cut-outs 27 (see FIG. 4) are provided in the horizontal rails 26 adjacent each of the chain sprockets 20 to permit passage of the chains around the sprockets.

Figure 3:
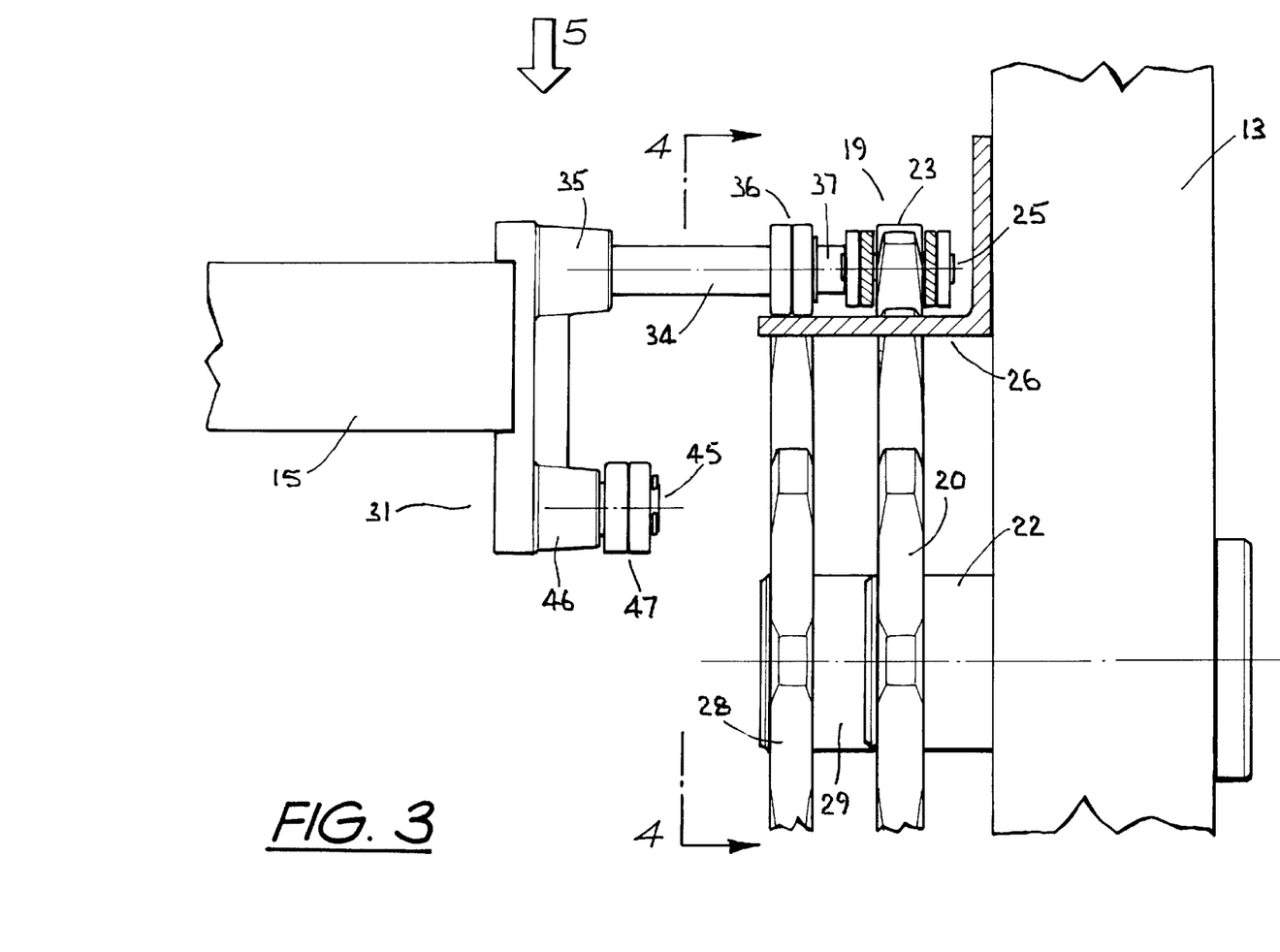
FIG. 3 illustrates a portion of a product transport system within the food processing oven, the view being seen in the direction of section plane 3—3 as shown in FIG. 1.
Figure 4:
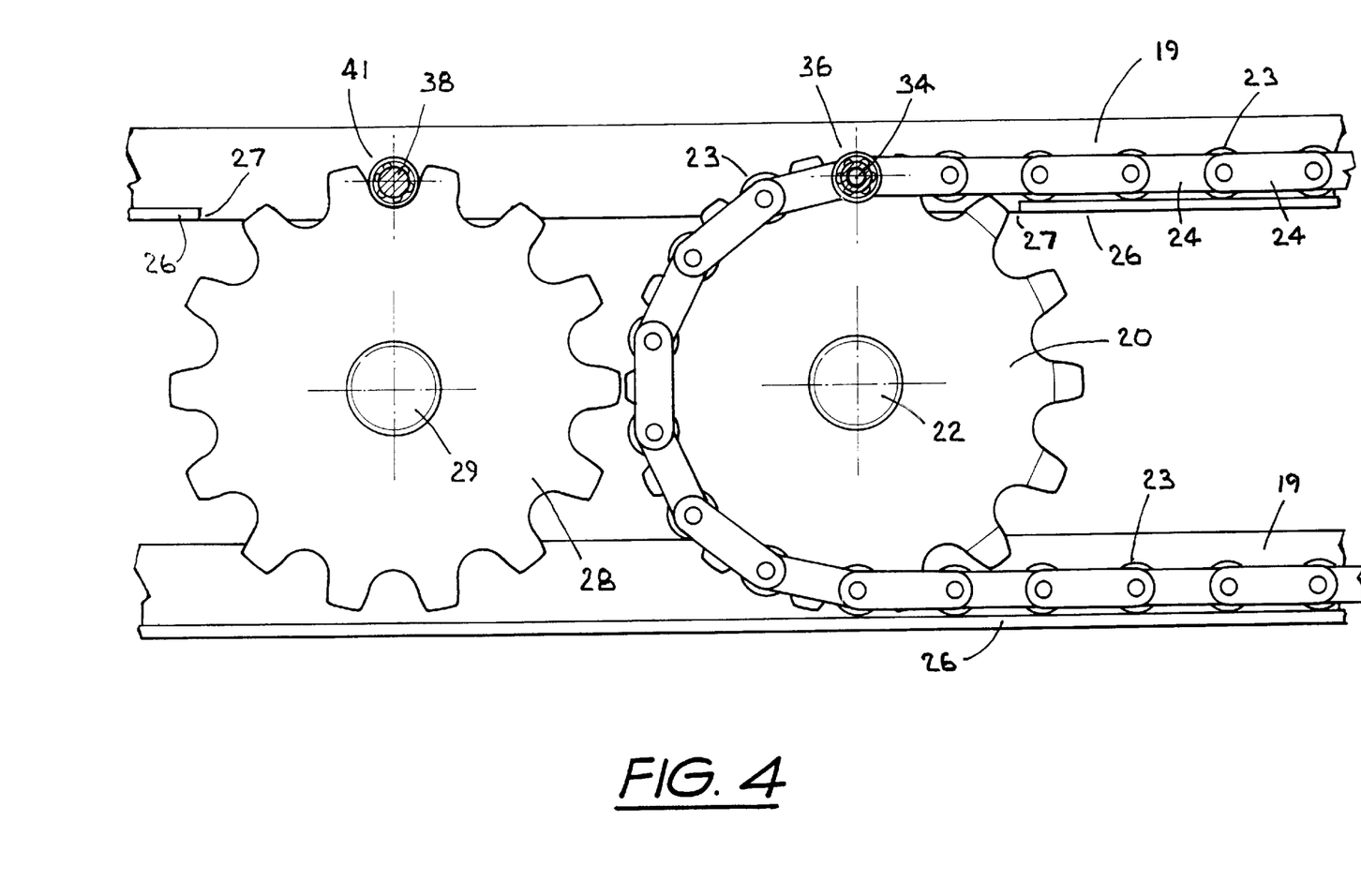
FIG. 4 illustrates the same portion of the food processing system as FIG. 3 but as seen in the direction of section plane 4—4 in FIG. 3.

A rotatable guide member 28 in the form of a toothed wheel is positioned laterally adjacent to but out of alignment with each of the chain sprockets 20. Thus, the guide members 28 are carried by live axles 29 that are located parallel to the axles 22 but which are longer than the axles 22. With this arrangement, which is best illustrated in FIGS. 3 and 4, interference between the conveyor chains 19 and the guide members 28 is avoided.

The chain sprockets 20 and the guide members 28 have the same size and number of teeth, and subsidiary chain drives (not shown) are provided for driving each guide member 28 in synchronism with its adjacent chain sprocket 20.

Figure 5:
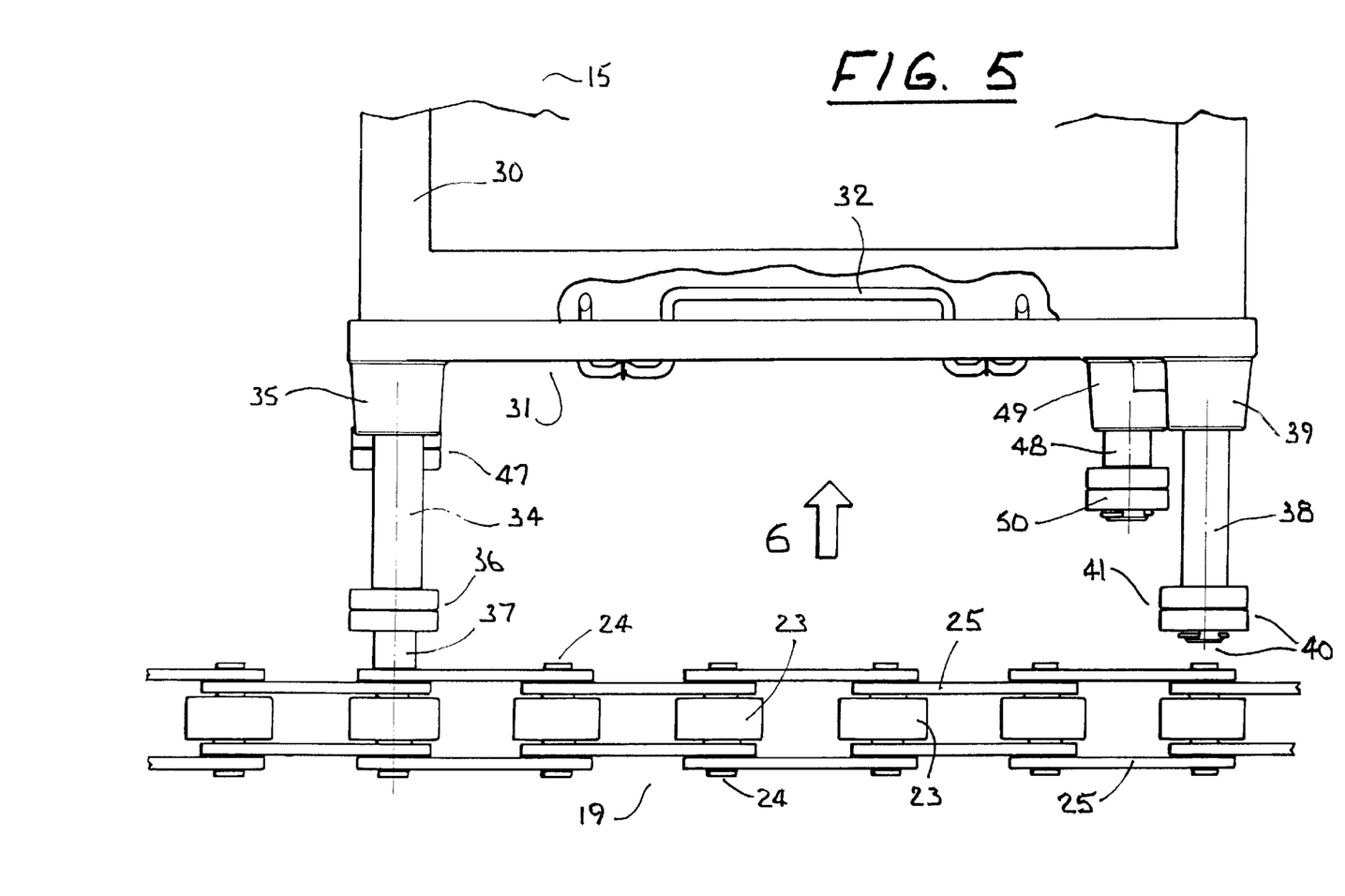
FIG. 5 shows a top view of the portion of the product transport system as shown in FIG. 3, as seen in the direction of arrow 5 as indicated in FIG. 3.
Figure 6:
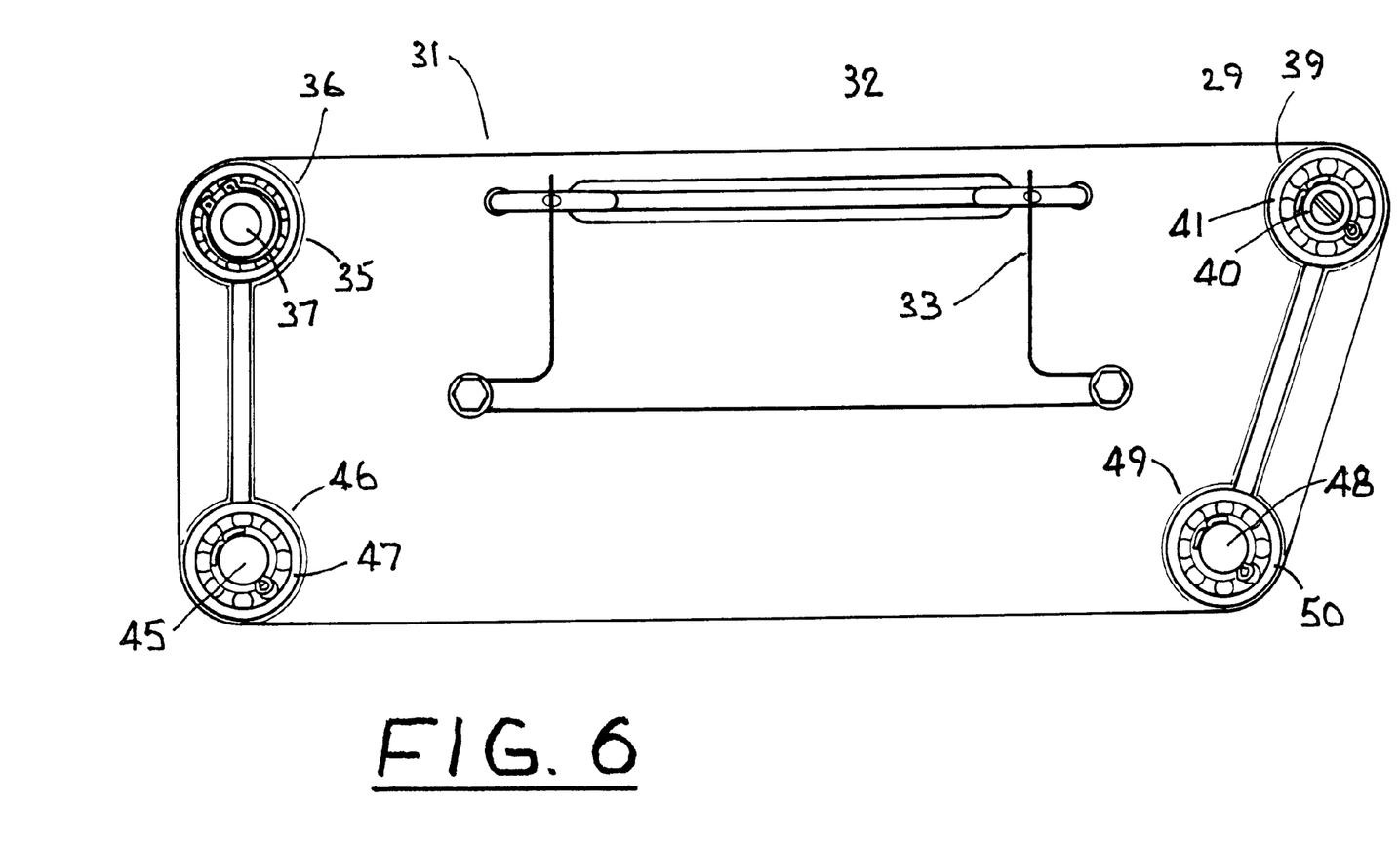
FIG. 6 shows a side elevation view of the portion of the product transport system as shown in FIG. 3, as seen in the direction of arrow 6 as indicated in FIG. 5.

Each of the product support trays 15 is removably mounted to a rectangular frame 30, a portion of which is illustrated in FIG. 5. Also, each support frame 30 is removably secured to and extends transversely between two spaced-apart carriers 31. The support frame 30 and, hence, the whole product support tray 15 is normally held captive between the two spaced-apart carriers 31 by a retractable engaging element 32 which is biased into an engaging position by a spring 33.

Each carrier 31 has a first spigot 34 which projects outwardly from a boss portion 35 of the carrier. The spigot 34 is formed as a stepped shaft that is connected at its outer end to an associated one of the conveyor chains 19 by way of the pivot pin 24. A roller 36 in the form of a ball bearing is mounted to a stepped portion 37 of the spigot and is positioned to ride on the horizontal rail 26, as shown in FIG. 3.

A second spigot 38 is located in spaced relationship and is disposed parallel to the first spigot 34. The second spigot 38 projects outwardly from a boss portion 39 of the carrier 31 and it has a length that is shorter than that of the first spigot 34. Thus, the second spigot does not extend to the conveyor chain 19 but, rather, has a stepped end portion 40 to which a roller in the form of a ball bearing 41 is fitted.

The roller 41 is positioned to align with the roller 36 and to ride on the horizontal rail 26. As a consequence, the conveyor chain 19 and the carrier 31 at each side of the oven chamber 10 are supported horizontally during the time that the product trays 15 are conveyed along the forward and return paths 17 within the chamber.

The distance between the first and second spigots 34 and 38 coincides with the centre-spacing of the sprockets 20 and the guide members 28, as indicated in FIG. 4, and coincides with the distance between an integer number of the chain pivot pins 24, as indicated in FIG. 5. Also, the length of the spigot 38 is such that the roller 41 will mesh with a guide member 28 when the spigot 34 aligns with a roller 23 that at any one time meshes with an adjacent one of the chain sprockets 20. This is most clearly shown in FIG. 4.

With the above described arrangement, when the conveyor chains are driven through changes in direction, that is from a forward direction and through 180° to a reverse direction, or through 90° from a horizontal direction to a vertical direction, the product trays 15 will be maintained in a horizontal disposition. That is, by meshing the two spigots 34 and 38 with corresponding portions of the chain sprockets 20 and guide members 28, and by rotating the sprockets and guide members in synchronism, the two spigots 34 and 38 are maintained in a constant positional relationship.

In order to facilitate movement of the product support trays 15 in a vertical direction, for example along the vertically extending forward path 43 as indicated in FIG. 1, a vertically extending guide channel 44 is provided within each side wall of the oven chamber 10. The conveyor chain 19 at each side of the oven chamber travels vertically along the guide channel 44 and, thus, the first spigot 34 (including the roller 36) projects into the guide channel.

A further (third) spigot 45 projects outwardly from the carrier 31 and is positioned vertically below the first spigot 34. The third spigot 45 is secured to an embossment 46 of the carrier 31 and it carries a roller 47 in the form of ball bearing.

When moving vertically along the guide channel 44, the two rollers 36 and 47 engage side walls of the guide channel and function to hold the support trays 15 in an horizontal disposition.

A fourth spigot 48 also projects outwardly from the carrier 31 but at a position that is located laterally below the second spigot 38. The fourth spigot 48 extends outwardly from a boss 49 and carries a roller 50 in the form of a ball bearing. The fourth spigot 48 and its roller 50 are provided to engage ramp surfaces (not shown) that are provided adjacent the side walls of the oven chamber to lift the roller 41 (which is mounted to the second spigot 38) into meshing engagement with a relevant one of the guide members 28 when directing a support tray into an horizontal path from a vertical path.

Variations and modifications may be made in respect of the invention as above described and defined in the following claims, having in mind that the central feature of the invention is the provision of adjacent chain sprockets and guide members for maintaining the product support trays 15 in horizontal dispositions when they are being directed through changes in direction.

I claim:

1. A product transport system which comprises a chamber, a pair of parallel, spaced-apart conveyor chains located within the chamber and arranged to convey a plurality of transversely extending product support trays through the chamber, a pair of transversely spaced carriers arranged to carry respective ones of the trays, chain sprockets located within the chamber in alignment with the respective conveyor chains and arranged to direct the respective conveyor chains through changes in direction (including through forward-and-return horizontal passes) within the chamber, rotatable guide members positioned laterally adjacent to but out of alignment with respective ones of the chain sprockets, means for driving each guide member in synchronism with an adjacent one of the chain sprockets, each carrier having an off-center first spigot that is connected to an associated one of the conveyor chains and an off-center second spigot that is positioned and arranged to engage with a said guide member when a portion of the conveyor chain to which the first spigot is connected is being directed around an adjacent one of the chain sprockets, horizontally extending rails located within opposite side walls of the chamber, the rails being positioned and arranged to support the forward-and-return horizontal passes of the respective conveyor chains and to support the first and second spigots of the respective carriers whereby the carriers are maintained in horizontal dispositions when moving through the forward-and-return horizontal passes within the chamber, vertically extending channels located within opposite side walls of the chamber for guiding the conveyor chains through vertically extending passes within the chamber, and each carrier being provided with a third spigot which is arranged together with the first spigot to locate within the channel and to act in conjunction with the first spigot to maintain the respective product support trays in horizontal dispositions when they are conveyed through the vertical pass.

2. The product transport system as claimed in claim 1 wherein each rotatable guide member comprises a toothed wheel which is arranged to be engaged by the second spigot of a said carrier at the same time as the first spigot of the carrier is aligned with an adjacent said chain sprocket, whereby the first and second spigots are carried through parallel paths when the conveyor chain imparts rotary motion to the conveyor chain sprockets and synchronised drive is transmitted to the toothed wheel.

3. The product transport system as claimed in claim 2 wherein each toothed wheel has the same size and number of teeth as its adjacent chain sprocket.

4. The product transport system as claimed in claim 1 wherein each of the conveyor chains comprises as roller chain having a roller carried by each link pin of the conveyor chain, and wherein the rollers engage with the horizontally extending rails during movement of the conveyor chains through the forward-and-return horizontal passes through the chamber.

5. The product transport system as claimed in claim 4 wherein the first spigots of respective ones of the carriers are connected with respective ones of the link pins of the conveyor chains.

6. A product transport system which comprises a chamber, a pair of parallel, spaced-apart conveyor chains located within the chamber and arranged to convey a plurality of transversely extending product support trays through the chamber, a pair of transversely spaced carriers arranged to carry respective ones of the trays, chain sprockets located within the chamber in alignment with the respective conveyor chains and arranged to direct the respective conveyor chains through changes in direction (including through forward-and-return horizontal passes) within the chamber, rotable guide members in the form of toothed wheels positioned laterally adjacent to but out of alignment with respective ones of the chain sprockets, means for driving each guide member in synchronism with an adjancent one of the chain sprockets, each carrier having an off-center first spigot that is connected to an associated one of the conveyor chains and an off-center second spigot that is positioned and arranged to engage with a said guide member when a portion of the conveyor chain to which the first spigot is connected is being directed around an adjacent one of the chain sprockets, horizontally extending rails located within opposite side walls of the chamber, the rails being positioned and arranged to support the forward-and-return horizontal passes of the respective conveyor chains and to support the first and second spigots of the respective carriers whereby the carriers are maintained in horizontal dispositions when moving through the forward-and-return horizontal passes within the chamber, each rotatable guide member comprises a toothed wheel which is arranged to be engaged by the second spigot of a said carrier at the same time as the first spigot of the carrier is aligned with an adjacent said chain sprocket, whereby the first and second spigots are carried through parallel paths when the conveyor chain imparts rotary motion to the conveyor chain sprockets and synchronized drive is transmitted to the toothed wheel, and a first spigot roller mounted to the first spigot of each carrier at a location between the carrier and the adjacent conveyor chain, the first spigot roller being arranged to travel along the horizontally extending rails during movement of the conveyor chains through the forward-and-return horizontal passes within the chamber.

7. The product transport system as claimed in claim 6 wherein a second spigot roller is mounted to an outer end portion of the second spigot of each carrier and wherein the second spigot roller is positioned for engagement with each of the toothed wheels.

8. The product transport system as claimed in claim 7 wherein the second spigot roller is aligned with the first spigot roller, in the direction of movement of the conveyor chains.

9. The product transport system as claimed in claim 1 wherein each of the product support trays is removably mounted to a support frame.

10. The product transport system as claimed in claim 9 wherein each support frame is removably mounted to and between each pair of the transversely spaced carriers.

11. The product transport system as claimed in claim 1 wherein the means for driving each guide member comprises a subsidiary chain drive that links the guide member to the adjacent chain sprocket.

* * * * *